G. S. WHITE.
INDEX.
APPLICATION FILED NOV. 16, 1917.

1,299,887.

Patented Apr. 8, 1919.
2 SHEETS—SHEET 1.

Fig.1.

GRANTORS' INDEX

Use Alphabetical Directory column to locate the name you are searching

| Alphabetical Directory | GRANTOR | | GRANTEE | Date of Deed | Date of Record | Vol | Page | LOCATION | INSTRUMENT |
|---|---|---|---|---|---|---|---|---|---|
| SAILER | Sayler | Adaline | A. L. Morgan | Apr. 2 1908 | Apr. 4 1908 | 162 | 54 | Scranton | |
| | Sailer | Bridget | New Equitable B&L Assn | Apr. 2 1895 | Apr. 4 1895 | 69 | 14 | Scranton | |
| | Sailer | Catherine Exr. | Hiram Pearson | Jun. 10 1890 | Jun. 12 1890 | 39 | 291 | Dunmore | |
| | Sailer | Caoline L | Michael Fruchtel | Sep. 7 1911 | Sep. 9 1911 | 166 | 538 | Scranton | |
| | Sailer | George R | C. J. P. Weichel | Sep. 2 1890 | Sep. 4 1890 | 35 | 425 | Scranton | |
| | Sailer | John G. Est. | Hiram Pearson | Jun. 10 1890 | Jun. 12 1890 | 32 | 291 | Scranton | |
| SALERNO | Salerno | Carmino | Thomas B. Jones | Dec 11 1902 | Dec 13 1902 | 137 | 88 | Old Forge | |
| | Salerno | Joseph et ux | Charles V. Amerman | Jan. 9 1908 | Jan. 11 1908 | 164 | 507 | Scranton | |
| | Salerno | Joseph et ux | Bertha Appleman | Jun. 17 1912 | Jun 17 1912 | 193 | 458 | Scranton | |
| SALMON | Salmon | Ann et al | Ezra B. Hurlbutt | Nov. 23 1891 | Nov. 25 1891 | 42 | 365 | Scranton | |
| | Sammon | Benjamin | Grace A. Uhrman | Feb. 6 1904 | Feb. 8 1904 | 110 | 240 | Scranton | |
| | Sammon | Benjamin | Central Loan & Invest Co. | Mar. 8 1910 | Mar. 10 1910 | 178 | 7 | Scranton | |
| | Sammon | Benjamin | Central Loan & Invest Co. | Aug. 11 1912 | Aug. 13 1912 | 196 | 1 | Scranton | |
| | Salmon | James | Taylorville B&L Assn | Sep 19 1888 | Sep 21 1888 | 24 | 191 | Old Forge | |
| | Sammon | John | James Sammon | Apr. 21 1912 | Apr. 25 1912 | 198 | 40 | Dunmore | |

Inventor:
Gustave S. White

G. S. WHITE.
INDEX.
APPLICATION FILED NOV. 16, 1917.

1,299,887.

Patented Apr. 8, 1919.
2 SHEETS—SHEET 2.

Fig. 2.

GRANTORS' INDEX

Use Alphabetical Directory column to locate the name you are Searching

| Alphabetical Directory | GRANTOR continued from page 1 | | GRANTEE | Date of Deed | Date of Record | Vol | Page | LOCATION | INSTRUMENT |
|---|---|---|---|---|---|---|---|---|---|
| SAMES | Sames | Henry | New Germania B&L Assn. | Jun. 2, 1897 | Jun. 2, 1897 | 86 | 451 | Scranton | |
| | Sames | William C. | German Bldg. Assn #6 | Jul. 5, 1892 | Jul. 5, 1892 | 45 | 449 | Scranton | |
| | Sames | William C. et ux | New Germania B&L Assn | Oct. 9, 1897 | Oct. 9, 1897 | 91 | 3 | Scranton | |
| | Sames | William et ux | New Germania B&L Assn | Feb. 5, 1900 | Feb. 5, 1900 | 121 | 143 | Scranton | |
| SAMMON | Sammon See Salmon page 1 | | | | | | | | |
| SAYLER | Sayler See Sailer page 1 | | | | | | | | |

Inventor
Justus S. White,
by
[signature] attys.

UNITED STATES PATENT OFFICE.

GUSTINE S. WHITE, OF SCRANTON, PENNSYLVANIA.

INDEX.

1,299,887. Specification of Letters Patent. Patented Apr. 8, 1919.

Application filed November 16, 1917. Serial No. 202,311.

*To all whom it may concern:*

Be it known that I, GUSTINE S. WHITE, a citizen of the United States, residing at 923 Clay Ave., Scranton, county of Lackawanna, State of Pennsylvania, have invented certain new and useful Improvements in Indexes; and I do hereby declare the following to be a full, clear, and exact description of the invention, such as will enable others skilled in the art to which it appertains to make and use the same.

This invention relates to indexes and particularly to what is known as "closed indexes," such indexes being used only for a period of time that has elapsed.

An object of the invention resides in the provision of an index by means of which the searching of records for recorded instruments will be greatly facilitated.

Specifically, an object of the invention resides in the provision of such an index that, should a searcher examine the same to locate the instruments which are recorded under a particular family name, all of the instruments that are actually recorded under such a name, together with all variations of the name, will be found at one and the same place in a ledger-like grouping, such groups of names being found without the aid of a sub-index, thus avoiding the time of looking through a sub-index, and the possibility of overlooking or making an error by having to use a sub-index, because most sub-indexes are based upon some key or code which is at times faulty, as the key letter arrangement sometimes subdivides a name so that the same name will be entered on different pages of the sub-index, thereby making it dangerous to depend upon a sub-index to search titles of land, as two accounts may have been opened for the same name and the searcher might look at the wrong account. For example, if the sub-index key for names was based upon the first two letters of the name, the name Schuler when it is spelled Schuler would be on a different page when it is spelled Shuler. There are hundreds of names of this class such as Shumaker–Schumaker, Ghering–Gearing, etc.

Still another object of the invention resides in the fact that the use of tabs that tear off and become mutilated and in time indistinct, are unnecessary and eliminated, thereby preserving the record much better and avoiding the extra cost of having the index rewritten from time to time.

Referring to the drawings which illustrate one embodiment of my invention, Figure 1 is a view of a fragment of one page of a grantors' index; and Fig. 2 is a view of a fragment of another page of the same grantors' index.

Referring particularly to Fig. 1 it will be noted that page 1 of a grantors' index is disclosed. This page may be a portion of a book or may be suitably bound with the remaining correlated pages in any desirable manner. The index is preferably made up of several books, one being provided for each letter of the alphabet, but this is not at all essential as, if it is desirable and feasible, the entire index may be made in one book. The pages are consecutively numbered at the corners as at 1 and 2, and each page is divided into a series of columns with suitable headings. The first column 3 is what is known as the "alphabetical directory," as indicated by 4 at the top of the column. In this column the surname of every person, corporation, association or firm, under which an instrument has been recorded appears. These surnames are arranged in alphabetical order. For instance, as illustrated in Fig. 1 "Sailer" is followed by "Salerno" which is in turn followed by "Salmon." In the case of a corporation, association or firm, the name of the same is indexed with the omission of the word "The," should this word be a part of the corporate, association or firm name. Thus the name which is being searched may be readily found in the alphabetical column 3 in the usual manner. Arranged beside this column 3 is a second column 5 which is known as the "grantors' column," as indicated at 6 at the top of the same. This column contains the name of every grantor in whose name an instrument has been recorded. These names are arranged so that the surname, or family name, precedes the given or Christian name. Thus the name "Sailer" appears in this column and this is followed by the given name of the grantor, "Bridget." When two or more instruments have been recorded under a single family name or a variation of a family name, the names constituting this family name or variation are arranged in groups alphabetically, according to the first letter of the given or Christian name. Thus, as illustrated in column 6 of Fig. 1, "Sailer, Bridget," is arranged before "Sailer, Catherine, exr.," and this latter name is arranged before "Sailer, George R." If a plurality of instruments have been recorded where the given or Christian name begins with "C," these grantors' names are arranged chronologically according to the date of record. Thus "Sailer, Catherine, exr.," is arranged before "Sailer, Caroline L.," as the date of record of the former instrument is June 12, 1890, and the date of record of the latter instrument is September 9, 1911. This arrangement of the grantors' names alphabetically according to the first letter of the given or Christian name and also chronologically according to the date of record, greatly facilitates the searching of the index. These surnames in the "grantors' column" are arranged in groups, being associated with each of the surnames in the "alphabetical directory column" 3. Thus the surname "Sailer" in the "grantors' column" 5, appears associated with the name "Sailer" in the "directory column" 3, so that should a searcher be looking for the name "Sailer" as a grantor he will first find it in the latter column and beside this name in this column will appear the name of each grantor whose surname is "Sailer."

Certain surnames are variations of other surnames. For instance, the surname "Sayler" is a variation of "Sailer" and when an instrument is recorded under the name of "Sayler" this name is indexed under the name of "Sailer" as well as under the name "Sayler" in the "alphabetical directory column." Therefore if a searcher is looking for the instruments indexed under "Sailer" he will not only encounter this name, but he will also encounter all variations of this name, for it may be that the particular instrument for which he is looking is recorded under one of the variations of "Sailer" for instance, rather than under the name "Sailer." With this arrangement it will be seen that it will be impossible for the searcher to overlook an instrument recorded in any variation of a family name without specifically searching all of the variations of the family name in the "alphabetical directory column." These surnames "Sailer" and "Sayler" which have been discussed appear at the upper left hand of Fig. 1 on the sheet 1 of the index. The same system of indexing is followed throughout the book. For instance, at the lower left hand of Fig. 1, the "alphabetical directory column" shows "Salmon" and the "grantors' column" shows "Salmon" and "Sammon."

Looking now at Fig. 2 it is seen that the "alphabetical directory column" is repeated at 7 and the "grantors' column" is repeated at 8. These columns are, in effect, continuation of the corresponding columns in Fig. 1. It will be noted that the surname "Sayler" appears at 9 in the "alphabetical directory column" 7, in Fig. 2. This name as has been before stated is a variation of the surname "Sailer" and is the same name which appears on the "grantors' column" 5 of page 1. Of course, it would be useless and a waste of time and labor to associate all of the names "Sailer" and "Sayler" in the "grantors' column" which are associated with the name "Sailer" in the "alphabetical directory column" with the name "Sayler" which appears in the "alphabetical directory column" at 9. Therefore to save this space and labor the searcher is referred to the name "Sailer" in the "alphabetical directory column." This reference is made by placing in the "grantors' column" 8, beside the name "Sayler," "See Sailer page 1," so if the searcher is examining the record for "Sailer" he will encounter all of the variations of this family name in the "grantors' column" and if he is searching for the name "Sayler" he will likewise be referred to all variations of this family name in the "grantors' column" 8. It will therefore be impossible to overlook a record instrument no matter under what variation of a family name it is recorded.

It will be seen that the surname "Sammon" appears at 10 on page 2 and that reference is made to the variation "Salmon" which appears on page 1 following out the same idea discussed in connection with the surnames "Sailer" and "Sayler."

The remaining portions of the pages are divided up into "grantees' columns" 11, columns 12, in which the dates of the deeds or instruments are noted, columns 13 in which the dates of recording are noted, columns 14 in which the volumes and pages on which the instruments are transcribed are noted and columns 15 in which the locations of the properties are recorded.

While I have described the "grantors' column" as being associated with an "alphabetical directory column," it is to be understood that the "alphabetical directory column" is really provided for the sake of convenience, as it forms in effect a thumb index, but this might be done away with entirely without destroying the system carried out in the indexes. Furthermore, the first name of any group in the "grantors' column" may be written in red ink for instance where the "alphabetical directory column" is omitted, so this first name will serve the same function as the name in the alphabetical directory column."

Furthermore, I have described the various columns as the grantors' column," the "grantees' column," the "date of deed column," the "date of record column," etc., but it is, of course, to be understood that these headings may be varied as the occasion demands. The gist of the invention does not lie in the provision of the headings, but in the particular manner of listing the grantor's name so as to facilitate the search.

I have described the index in connection with certain names which begin with the letter "S", but it is to be, of course, understood, that this same method is employed in indexing the names starting with each letter of the alphabet. Furthermore while a grantor's index has been illustrated for the sake of convenience, it is to be understood, that the method can be carried out in a grantees' index with equal facility and in fact in various indexes where the names of parties are assembled.

What I claim is:—

1. In a closed index, all variations of a single surname arranged in a column in dictionary order, a group of all of said variations arranged in a second column and adjacent to one of the variations in the first column, and a cross reference, adjacent to each of the other variations in the first column, to the variation with which said group is associated.

2. In a closed index, all variations of a single surname arranged in a column in dictionary order, a group of all of said variations arranged in a second column and adjacent to one of the variations in the first column, the variations comprising the group being arranged alphabetically according to the first letter of the Christian names, and a cross reference, adjacent to each of the other variations in the first column, to the variation with which said group is associated.

In testimony whereof I affix my signature.

GUSTINE S. WHITE.

Copies of this patent may be obtained for five cents each, by addressing the "Commissioner of Patents, Washington, D. C."